United States Patent [19]
Russell et al.

[11] 3,803,486
[45] Apr. 9, 1974

[54] FREQUENCY RESPONSIVE APPARATUS

[75] Inventors: Michael Cunningham Baron Russell, Blewbury; Colin Leonard Desborough, Faringdon, both of England

[73] Assignee: United Kingdom Atomic Energy Authority, London, England

[22] Filed: Nov. 29, 1971

[21] Appl. No.: 202,956

[30] Foreign Application Priority Data
Dec. 23, 1970 Great Britain.................... 61267/70

[52] U.S. Cl. ............................. 324/78 D, 324/78 Q
[51] Int. Cl. ........................................... G01r 23/02
[58] Field of Search ..... 324/78 D, 79 D, 78 Q, 186, 324/34 TK; 235/92 EV, 92 FQ

[56] References Cited
UNITED STATES PATENTS

| | | | |
|---|---|---|---|
| 3,509,484 | 4/1970 | Basse | 324/78 D |
| 2,590,641 | 3/1952 | Musk | 324/79 D |
| 3,571,760 | 3/1971 | Schwartz et al. | 324/78 Q |
| 2,581,394 | 1/1952 | Dinger | 324/34 TK |

Primary Examiner—Alfred E. Smith
Attorney, Agent, or Firm—Larson, Taylor & Hinds

[57] ABSTRACT

Changes in a variable frequency, such as produced by a flaw-detecting eddy current transducer, are measured by means of a bi-directional digital ring counter which is caused to perform, during two successive time intervals, respective counting operations in opposite counting directions, the length of the time intervals being determined by the transducer frequency and the counting rate of the counting means being determined by a reference frequency. In this way, the count of the counter at the end of the second time interval is dependent on the change of the transducer frequency over the two time intervals. In a second mode of operation, the count of the counter is measured at the end of a single time interval, and is thus a measure of the absolute value of the transducer frequency. In a further mode of operation, the reference frequency itself is variable, so that the count of the counter at the end of the two time intervals is dependent on both input frequencies. The final count of the counter, or only the more significant digits thereof, may be fed into a binary to octal converter for recording the output on a multi-tone recorder.

14 Claims, 2 Drawing Figures

FREQUENCY RESPONSIVE APPARATUS

BACKGROUND OF THE INVENTION

The invention relates to apparatus responsive to a variable frequency input.

In one exemplary application, apparatus according to the invention may be used to compare two frequencies one of which may be fixed. In other applications, apparatus embodying the invention may, for example, be used to process the output from a transducer producing a signal whose frequency varies with variations in a sensed parameter. Such a transducer may, for instance, comprise a probe having a tuned coil coupled to a test sample to be inspected, whereby flaws and the like in the test sample alter the resonant frequency of the coil and produce a consequent alteration in the output frequency of the probe.

It is known to measure a variable frequency by counting the frequency for a fixed time period. This method may be disadvantageous, particularly where the unknown frequency is relatively low: in such cases, the sampling time taken to produce a given resolution output may be excessive.

It is an object of the invention to provide an improved method and apparatus for sensing a variable input frequency.

It is a further object of the invention to provide improved apparatus and method for sensing changes in a variable input frequency.

SUMMARY OF THE INVENTION

According to the invention, there is provided apparatus responsive to a variable frequency, comprising recirculatable counting means, reference means connected to the counting means for controllably supplying pulses at a reference frequency to the counting means for counting thereby, and control means operative in response to the variable frequency to cause the counting means to count the pulses of the reference frequency for a time interval whose length is dependent on the value of the variable frequency, whereby the count in the counting means at the end of the said time interval is dependent on the variable frequency.

According to the invention, there is further provided a method of measuring the value of change in value of at least one variable frequency, comprising the step of counting a second frequency for at least one time interval whose length is dependent on the said variable frequency.

DESCRIPTION OF THE DRAWINGS

Apparatus embodying the invention, and methods according to the invention, for producing digital outputs representative of the value of, or changes in the value of, a variable frequency will now be described, by way of example only, with reference to the accompanying drawings in which.

DESCRIPTION OF THE PREFERRED EMBODIMENT

Figure 1:
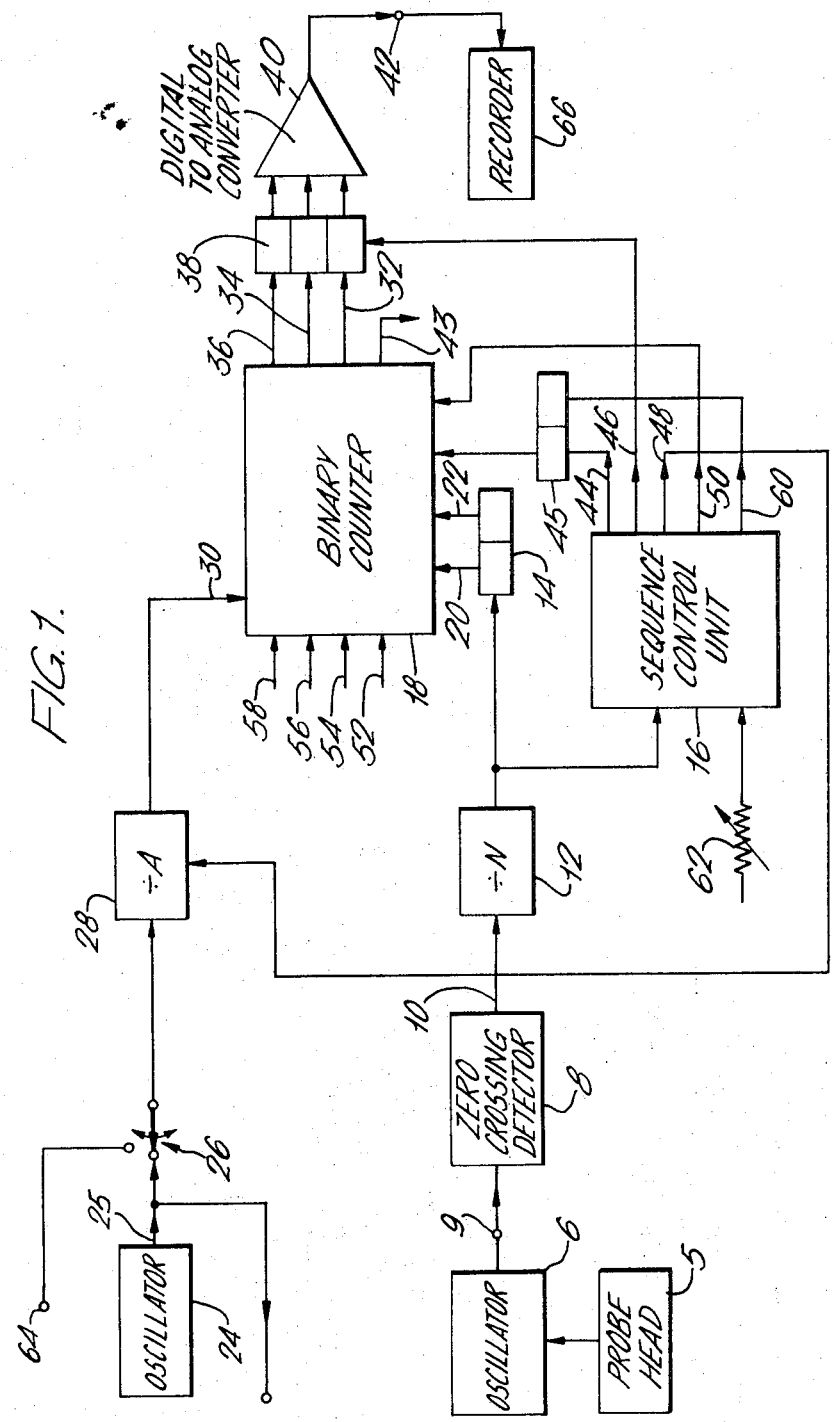
FIG. 1 is a block diagram of the apparatus, in combination with an input probe whose output frequency varies with conditions in an inspected test piece.

Referring to FIG. 1, the input probe 5 contains capacitors (not shown) and a coil (also not shown) which is electromagnetically coupled to the test piece and induces eddy current therein. Flaws in the test piece cause a change in effective inductance of the probe. A thermistor in series with the tuned coil can minimise variations in frequency caused by temperature changes in the coil. To sense the inductance changes, the probe 5 is driven by an oscillator 6. As the effective inductance of the probe changes so will its resonant frequency, and thus the frequency of the oscillator 6 will vary. A zero crossing detector 8 is connected at a terminal 9 to receive the oscillator output, senses the frequency of the oscillator and produces a shaped waveform having a frequency corresponding to the resonant frequency of the probe. This output frequency is fed on a line 10 to a frequency divider 12 having a frequency division factor of $N$. The output from the divider 12 is fed to a flip-flop circuit 14 and also to a sequence control unit 16. The flip-flop 14 is connected to a four-bit binary reversible and recirculating counter 18 by means of lines 20 and 22. When the flip-flop 14 is in a first stable state, line 20 is energised and line 22 unenergised, and the counter 18 is set to count UP. When the flip-flop is in its second stable state, line 22 only is energised, and the counter 18 is set to count DOWN.

The apparatus also includes a stable oscillator 24 having, in this example, a fixed frequency of $F = 10$ MHz whose output is fed via a line 25 and a switch 26 to a frequency divider 28 having a frequency division factor of $A$. The output from the frequency divider 28 is fed to the COUNT input 30 of the counter 18.

The three most significant stages of the counter 18 are fed, by means of lines 32, 34 and 36, to the respective stages of a buffer store 38 whose output controls a digital-to-analogue converter 40 connected to an analogue output terminal 42. The least significant bit from the counter 18, on a line 43, is not fed to the buffer store 38.

The operation of the apparatus is controlled by the sequence control unit 16 which is activated by each pulse from the divider 12. The unit 16 has an output line 44 which is connected to a flip-flop 45 and, when energised, inhibits counting of the counter 18. A second line 46 from the unit 16 is connected to the store 38, and, when energised, clears the store and then loads it with the signals presented on line 32 to 36. A third line 48 from the unit 16 is connected to the divider 28 and, when energised, clears the divider and resets it to respond to the next positive-going signal from the oscillator 24. A fourth output line 50 from the unit 16 is connected to the counter 18 and, when energised, clears the counter and sets it to a pre-set number which is fed in by means of four digit lines 52 to 58. The fifth line 60 from the unit 16 is connected to switch the flip-flop 45 to remove the inhibit from the counter 18.

The unit 16 is arranged to respond to each alternate pulse from the divider 12 by energising the lines 44, 46, 48, 50 and 60 in that order. In response to each intervening pulse from the divider 12, it energises the lines 44, 48 and 60 (in that order) only. By means of a variable control 62, the length of elapsed time between energisation of the lines 44 and 60 can be varied for a purpose to be described. In its minimum setting, the control 62 sets the elapsed time to about 0.5 $\mu$s.

The operation of the apparatus will now be described. It will be assumed that the probe is being scanned over (that is, moved relative to) the testpiece.

It will further be assumed that the unit 16 has just completed a full sequence of operation, that a pre-set binary number 0000 has been inserted into the counter 18 on the lines 52 to 58, and that the flip-flop 14 is energising the line 20 to set the counter 18 to count UP.

Clock pulses from the oscillator 24 now cause the counter 18 to count up at the fixed frequency of $F/A$. When $N$ pulses have been produced by the zero crossing detector 8, the divider 12 produces an output pulse which activates the control unit 16 so that the latter energises line 44 to prevent counting of the counter 18. At the same time, the flip-flop 14 is switched to energise line 22 so as to set the counter 18 to count DOWN. The unit 16 then energises line 48 to reset the divider 28 and finally energises line 60 to remove the inhibit on the counter 18. Further pulses at the fixed frequency $F/A$ are now fed into the counter 18 and now cause the counter to count down.

When $N$ further pulses have been produced from the detector 8, divider 12 produces an output pulse and unit 16 thereupon energises the line 44 to inhibit counting of the counter 18, and at the same time the flip-flop 14 is switched to energise line 20 again. The unit 16 then energises line 46 to clear the buffer store 38 and feed the three most significant bits of the final count in the counter 18 at this time into the buffer store. The unit 16 then energises line 48 to reset the divider 28, energises line 50 to clear the counter 18 and to reload the pre-set number (0000) into the counter, and finally energises line 60 to remove the inhibit from the counter 18. The apparatus is then back in the original state, and the sampling operation described above repeats.

In the above-described sampling operation, there are two consecutive sampling periods, a first sampling period (duration $t1$) during which the counter 18 counts up, and a second sampling period (duration $t2$) during which the counter counts down. Therefore, the number of clock pulses fed into the counter 18 during the first sampling period is $t1.F/A$, the number of pulses fed in during the second sampling period is $t2.F/A$. Thus, the final count of the counter 18 at the end of the second sampling period is X where $$X = t1.(F/A) - t2.(F/A) \quad (1)$$

If the output frequency from the detector 8 is $f1$ at the beginning of the first sampling period, $f2$ at the end of the second sampling period, and $f$ at the mean time, then $$t1 = 2N/(f1+f) \quad \text{and} \quad (2)$$

$$t2 = 2N/(f2+f) \quad (3)$$

Substituting equations 2 and 3 in equation 1, $$X = 2\,N.F/A(f1+f) - 2\,N.F/A(f2+f)$$

Therefore, $$X = [2\,N.F\,(f2-f1)/A(f1+f)(f2+f)] \quad (4)$$

If it is assumed that $(f1+f)$ and $(f2+f)$ are each equal to $2f$, then, approximately, equation 4 can be re-written as $$X = [(f2-f1).NF/2Af^2] \quad (5)$$

Therefore, the change in frequency, df (equal to $f2 - f1$), is given by $$df = (2Af^2.X/NF), \text{ and} \quad (6)$$

$$(df/f) = (X.2fA/NF) \quad (7)$$

It will therefore be seen that the final count $X$ of the counter 18 at the end of the two consecutive sampling periods indicates the change in frequency sensed by the probe. The analogue output at terminal 42, corresponding to the three most significant digits of the final count $X$, can be used to drive a recorder 66. Thus, if the recorder 66 is a pen recorder, a plot of the analogue output against time will be a substantially straight line, at a value dependent on the value of the pre-set number fed in on the lines 52 to 58, for so long as the input frequency produced by the probe remains constant. A change in probe frequency will cause a step in this line. In practice, the pre-set number set into the counter by means of the lines 52 to 58 might not be 0000, but might be 1000 (this is, decimal 8) instead. Thus, the trace produced by the pen recorder would diverge, in response to changes in probe frequency, either above or below the straight line depending on the direction of frequency change.

Instead, the recorder 66 could be a multitone recorder which prints eight (say) different levels as distinguishable tones from white to black. In such a case, the converter 40 would be a binary to octal converter which converts the eight different possible binary values of the count $X$ into eight different levels each of which would cause the recorder to produce a differently toned record.

It will be seen from the above that the mode of operation of the apparatus described is the inverse of that of apparatus in which the number of cycles of the variable frequency occurring in a predetermined period of time is measured. The mode of operation of the apparatus of FIG.1 is particularly advantageous in applications where the frequency of the variable frequency input is below that of the reference oscillator 24. The apparatus is thus particularly advantageous for use with an eddy current probe of the type described. Effectively, the operation is as if two identical probes were being used to compare one part of the test piece with another. The separation of the two compared parts of the test piece is adjustable over a wide range either by changing the sampling time (that is, by varying the value of $N$) or by altering the rate of scan of the probe over the testpiece.

The probe can be scanned over the testpiece in any convenient way. For example, the probe may be held stationary relative to the testpiece, and the field from its coil can be scanned over the testpiece by rotating an appropriately shaped (L- or U-shape, for example) ferrite core relative to the coil. If, simultaneously, the coil or the test piece is moved linearly, a helical scan of the testpiece is effectively produced, and may be particularly advantageous for searching for cracks within bolt holes or for on-line inspection of rods and tubes.

The probe core may be spring-loaded against the testpiece with, for example, a thin plastics material washer between them. The washer can be shaped to make the core of the probe follow eccentric movements of the testpiece.

It will be appreciated that there is no limit on the size of numbers which can be subtracted by the counter 18, since it overflows without error. However, there could, in this example (the counter having only four bits), be ambiguity if the difference between the two numbers subtracted during each sampling process exceeds 15 or had an unknown sign. This difficulty can be overcome by choosing values of A and N which keep the difference small. The dividers 12 and 28 are preferably, therefore, made adjustable to any one of predetermined integral values. For example, the factor A could be adjustable to have a value of 1, 5, 10, 50 or 100, while the factor N could be made adjustable to have a value of 2, 10, 20, 100, 200 or 1,000. Provided the frequency changes only slowly, the record produced by the recorder 66 will indicate when the total frequency change since the beginning of the record has risen to such an extent that the final count of the counter has exceeded 15 and restarted at zero.

The probe frequency is affected not only by flaws in the testpiece being inspected, which produce rapid changes in frequency, but also by variations in the distance between the probe and the article, a change in the bulk permeability or conductivity of the material of the testpiece, electronic noise, and drift of tuning capacitance, all of which produce relatively slow changes in probe frequency. From equation 6 above, it will be seen that $$(df/dt) = X.(Af^3)/N^2.F \qquad (8)$$

Figure 2:
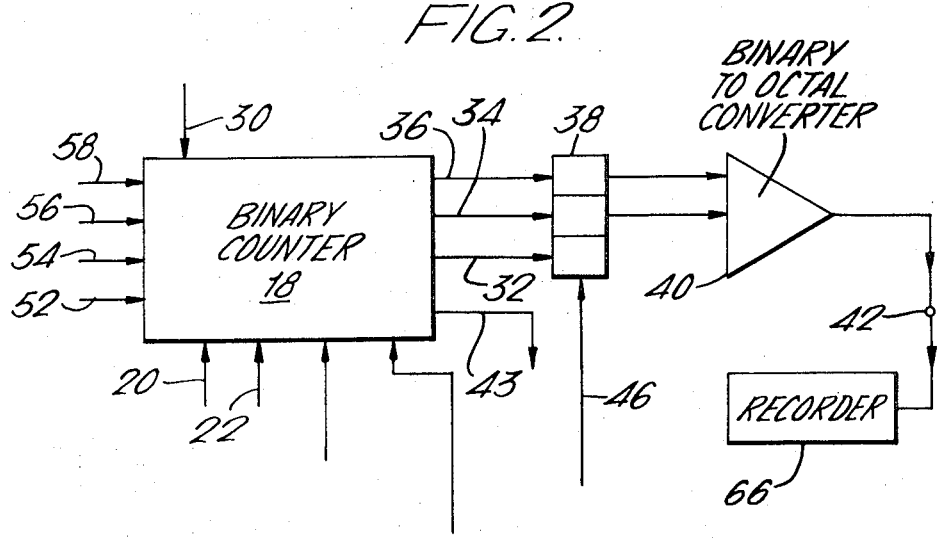
FIG. 2 shows a modification of the apparatus of FIG. 1.

By appropriately choosing the values of A and N in relation to the value of f, X can be made to change by not more than decimal 1 for the slow frequency changes outlined above. If, therefore, the apparatus is used with an output unit responsive only to changes of decimal 2 or greater, it can be made to respond only to frequency changes caused by discontinuities or defects in the article. This type of response can be achieved by modifying the connections from the buffer store 38 to the binary to octal converter 40 in the manner shown in FIG.2 (in which the circuitry of the remainder of the apparatus connected to the counter 18 is omitted for clarity). The pre-set number fed into the binary counter 18 on lines 52 to 58 during each sampling sequence is arranged to be 0001. A change of decimal 1 in the value of X, (as a result of a slow frequency change), would therefore change the final count of the counter 18 to 0010 or 0000, depending on the direction of the frequency change. Since, with the mode of connection shown in FIG.2, the converter 40 is unable to distinguish between 0010 and 0000, there would be no change in the output of the buffer store and the output recorder 66 would be unresponsive. In the event of a change in decimal 2 in the final count X, as a result of detection of a flaw, the binary output from the counter 18 changes to 0011 or 1111, depending on the direction of the frequency change: the binary count changes to one of these values as the probe approaches the flaw and to the other of these values as the probe leaves the flaw, and the converter 40 responds to the change to the value 1111, and activates the recorder 66. The recorder 66 is a multi-tone recorder arranged to produce a white record, for example, until count changes of more than decimal 1 occurs, whereupon it would produce a black record. The above technique could be modified to cause the recorder to respond only to count changes greater than decimal 2 if desired so as to render the apparatus unresponsive to all except large flaws.

The apparatus can be used to record variations in the absolute value of the probe frequency. This can be carried out by removing the connection 22 (or by opening a switch in this line) so as to prevent the counter 18 from counting down. The operation of the apparatus is otherwise the same as that described above. Therefore, the counter 18 is counted up by the pulses produced by the divider 28 for a time interval which starts when the line 60 of the unit 16 is energised and which ends when the next following pulse is produced from the divider 12. The final count in the counter 18 is thus a measure of the input frequency and can be recorded by suitable recording means such as the multitone recorder described above. It will be appreciated that the length of the inhibit time, that is, the time elapsing between energisation of the line 44 by the unit 16 and the subsequent energisation of the line 60, affects the number of pulses fed into the counter 18 from the divider and thus affects the final count of the counter. Thus, the control 62 can be varied until a final count value of zero (or some other number) is achieved, the setting of the control 62 then being a measure of the probe frequency.

In a modification to the above procedure, not only is the connection 22 removed, but the apparatus is arranged so that the counter 18 continues to count up, without interruption, during the period when, but for the removal of connection 22, it would otherwise count down. The total time over which the probe frequency is counted is therefore approximately doubled.

As shown in FIG.1, the switch 26 can be set so that the frequency applied to the divider 28 is received from an external frequency source 64 instead of the oscillator 24. This enables the reference frequency to be modulated in a particular manner to render the apparatus unresponsive to similar modulations in the probe frequency.

The digital output from the counter 18 or from the buffer 38 may be fed directly into suitable data processing equipment.

In a modification, a single probe is used with two separate apparatuses, each as shown in FIG.1. The pre-set number fed into the first apparatus on the lines 52 to 58 thereof is predetermined in accordance with the output of the probe when inspecting a reference sample. Thus, for example, the pre-set number could be such that the final output count of the counter 18 in the first apparatus is zero when a test piece inspected by the probe is identical with the reference sample. The pre-set number fed into the lines 52 to 58 of the second apparatus is the final count obtained from the counter 18 of the first apparatus during the previous measurement. In this way, the testpieces can be sequentially compared with each other.

Instead, only one apparatus can be used with a single probe, the pre-set number fed into its lines 52 to 58 during each comparison being predetermined in accordance with measurements made on a reference sample. The probe is then successively used to inspect separate testpieces or different areas of the same testpiece, and the final count from the counter 18 after each such test represents a comparison of the testpiece with the reference sample.

The probe may be constructed in the form of an oscillator 6, and a series of interchangeable heads each incorporating an inspection coil and tuning capacitors, each head being differently tuned to suit a particular inspection application. Instead of detecting flaws in testpieces, the probe may be used to measure permeability or other parameters affecting the resonant frequency of the probe.

Although the apparatus described is particularly advantageous for use with an eddy current probe, it will be appreciated that it is by no means limited to such use but can be used in many other applications where variations in an input frequency are to be sensed and measured.

Instead of connecting the oscillator 24 to the divider 28, a second external frequency can be connected to that terminal and the apparatus then compares the two external frequencies, both of which may be variable. In such an application, one of the frequencies may, for example, be representative of the resistive component of the resonant circuit of a probe such as already described and the other may be representative of the inductive component.

The apparatus may also be operated with the switch 26 set to receive the output of oscillator 24, and with a frequency input representative of the resistive component of the resonant circuit of the probe fed in at terminal 9.

The apparatus of FIG.1 may be modified so that the output line 50 operates to reset the counter 18 only after occurrence of an external reset pulse. If the line 50 is connected to the reset input of the counter 18 via an AND gate whose second input is fed from one side of a flip-flop, then if the flip-flop is arranged to be set into one stable state by the external reset pulse and into the other stable state from the output, delayed, of the AND gate, then the line 50 can reset the counter only once after each occurrence of the external reset pulse.

For measuring wall thickness in test pieces of non-magnetic and/or non-conductive material, the probe may be tuned to a frequency which is low enough to avoid significant eddy currents in the test piece. A piece of magnetic material is positioned on the far side of the wall of the test piece, and the response of the probe now depends on its distance from the magnetic material and so the position of an inaccessible surface can be measured.

What we claim is:

1. Apparatus for indicating the change in value of a frequency which varies in an unknown manner comprising
    recirculatable reversible counting means,
    reference means connected to the counting means for controllably supplying to the counting means, for counting thereby, pulses at a reference frequency which is predetermined and greater than the variable frequency, and
    control means comprising means operative in response to the variable frequency to cause the counting means to count the pulses of the reference frequency for a first time interval whose length is dependent on the value of the variable frequency, means responsive to the end of the said first time interval to set the counting means to count in the opposite direction without resetting the count of the counting means, and means operative thereafter to cause the counting means to count the pulses of the reference frequency for a second time interval whose length is dependent on the variable frequency whereby the count in the counting means at the end of the said second time interval is dependent on the change in the variable frequency over the two time intervals.

2. Apparatus according to claim 1, including frequency dividing means connected to receive an input frequency and operative to produce a succession of control pulses at the variable frequency, each control pulse being produced in response to the same predetermined number of cycles of the input frequency, and in which the control means comprises
    means operative in response to one such control pulse to initiate counting by the counting means and thereby initiate the first time interval,
    means operative in response to the second one of the control pulses to halt counting by the counting means and thereby end the first time interval,
    means operative in response to the second control pulse to set the counting means to count in the opposite direction without resetting the count of the counting means
    means responsive to the said second control pulse to cause the counting means to re-start counting and thereby to initiate the second time interval, and
    means responsive to the third control pulse to end counting by the counting means and thereby to end the second time interval.

3. Apparatus according to claim 1, including converting means connected to the output of the counting means for producing a signal level dependent on the digital count thereof at the end of the said time interval, and
    recording means connected to receive the signal level and to produce a visible record thereof.

4. Apparatus according to claim 3, in which the converting means is a digital to analog converter.

5. Apparatus according to claim 3, in which the counting means is a binary counter and in which the converting means is a binary to octal converter.

6. Apparatus for comparing two frequencies at least one of which is variable in an unknown manner, comprising
    reversible recirculatable digital counting means,
    sequence control means responsive to the said one frequency and operative to set the counting means to count in one direction during a first time interval whose length is dependent on the value of the said one frequency during that time interval and to count in the opposite counting direction during a second time interval whose length is dependent on the value of the said one frequency during that time interval, and
    means responsive to the sequence control means to gate the said other frequency into the counting means for counting thereby during the first and second time intervals, whereby the count of the counting means at the end of the second time interval is dependent on the two frequencies.

7. Apparatus according to claim 6, in which the said other frequency is fixed whereby the count of the counting means at the end of the second time interval is dependent on the change in the variable frequency over the two time intervals.

8. Apparatus according to claim 6, in which both frequencies are variable in an unknown manner.

9. Apparatus according to claim 6, including frequency dividing means connected to receive an input frequency and operative to produce a succession of control pulses at the said one frequency which are separated from each other by the same predetermined number of cycles of the said input frequency, and in which the sequence control means is connected to receive the control pulses such that the beginning of the first time interval is initiated in response to a first one of the control pulses, while the second control pulse ends the first time interval, causes reversal of the counting direction of the counting means and initiates the second time interval, and the third pulse ends the second time interval.

10. Apparatus according to claim 6, including presettable input means connected to the counting means and operative, in response to the sequence control means, to feed into the counting means, before the first time interval, a predetermined number from which subsequent counting starts.

11. Apparatus according to claim 6, including digital to analog converting means connected to receive the more significant digits, only, of the count of the counting means at the end of the second time interval and operative to convert them into a corresponding analog signal, and recording means connected to receive and record the said analog signal.

12. Apparatus according to claim 6, in combination with transducer means operative to produce the said variable frequency in dependence on the value of a physical parameter.

13. A method of measuring the change in value of a frequency which varies in an unknown manner, comprising the step of counting a second frequency for two time intervals each of whose lengths is dependent on the instantaneous value of the said variable frequency, the counting during the second time interval starting at the count value existing at the end of the first time interval and being in the opposite counting direction, whereby the final count is dependent on the change in the value of the variable frequency over the two time intervals.

14. A method according to claim 13, in which the second frequency is fixed.

* * * * *